Nov. 23, 1948.  R. C. SANDERS, JR  2,454,673
RADIO BOMB RELEASE SYSTEM
Filed March 2, 1944  3 Sheets-Sheet 1
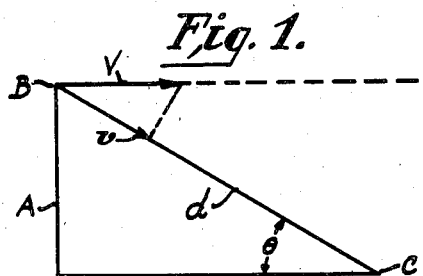
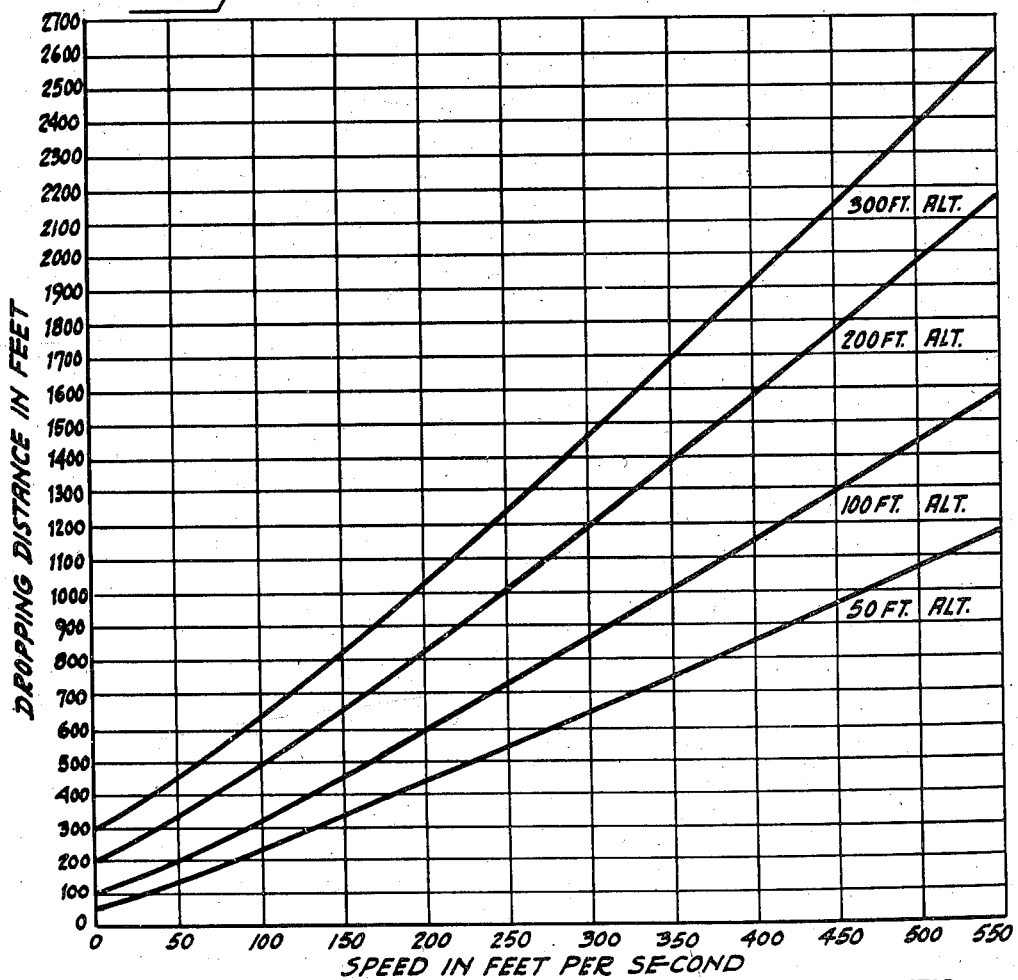
INVENTOR.
ROYDEN C. SANDERS JR.
BY
ATTORNEY Nov. 23, 1948.   R. C. SANDERS, JR   2,454,673
RADIO BOMB RELEASE SYSTEM
Filed March 2, 1944   3 Sheets-Sheet 3
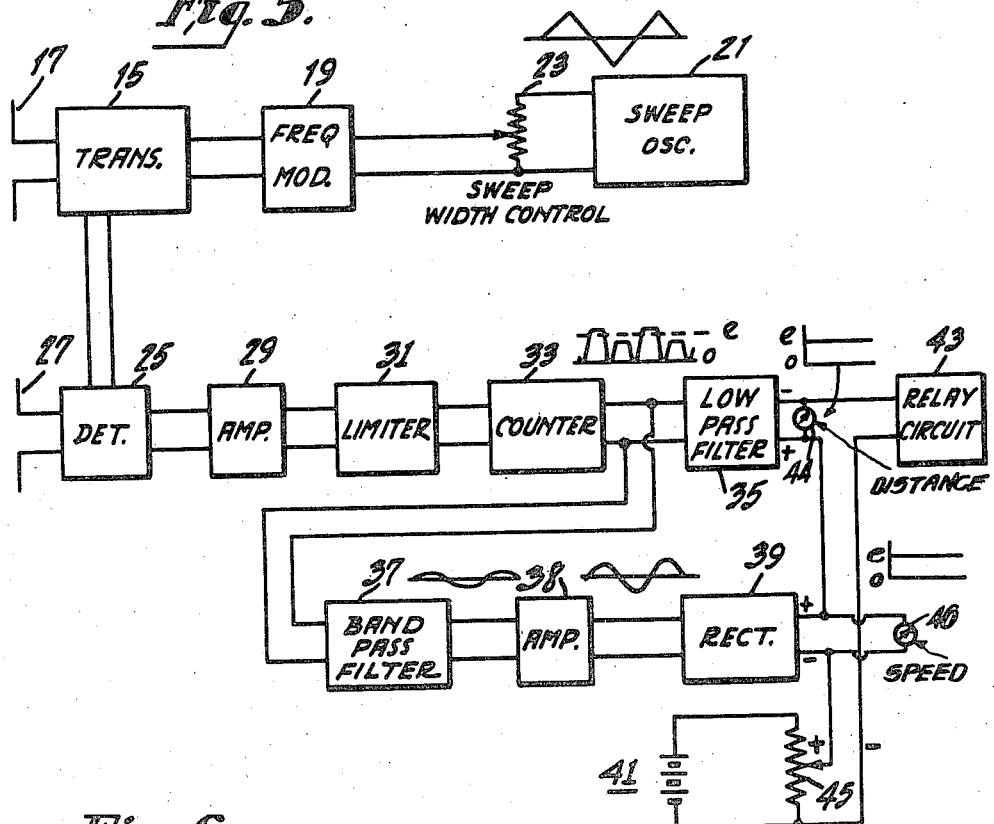
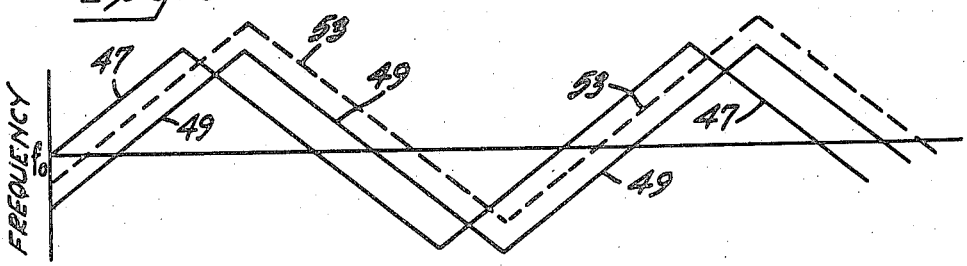
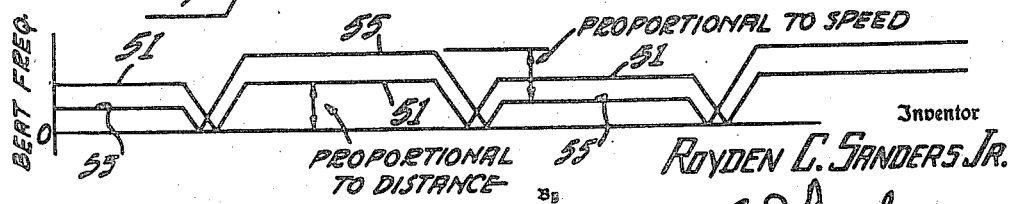
Inventor
ROYDEN C. SANDERS JR.
Attorney Patented Nov. 23, 1948

2,454,673

UNITED STATES PATENT OFFICE 2,454,673

RADIO BOMB RELEASE SYSTEM

Royden C. Sanders, Jr., Hightstown, N. J., assignor to Radio Corporation of America, a corporation of Delaware Application March 2, 1944, Serial No. 524,795

4 Claims. (Cl. 343—7)

This invention relates to bomb release apparatus, and more particularly to systems for automatically releasing a bomb or other missile from an aircraft directed at a surface vessel, in response to radio measurements of the relative speed and the distance between the aircraft and the target.

The principal object of this invention is to provide a method of and means for energizing a bomb release mechanism in response to radio reflection distance and speed measuring means.

Another object of the invention is to provide a method of and means for electrically computing the measured distance from the target at which the missile is to be released in order to hit.

A further object is to provide an improved method of and means for measuring the speed of an aircraft relative to an object on the surface.

Figure 3:
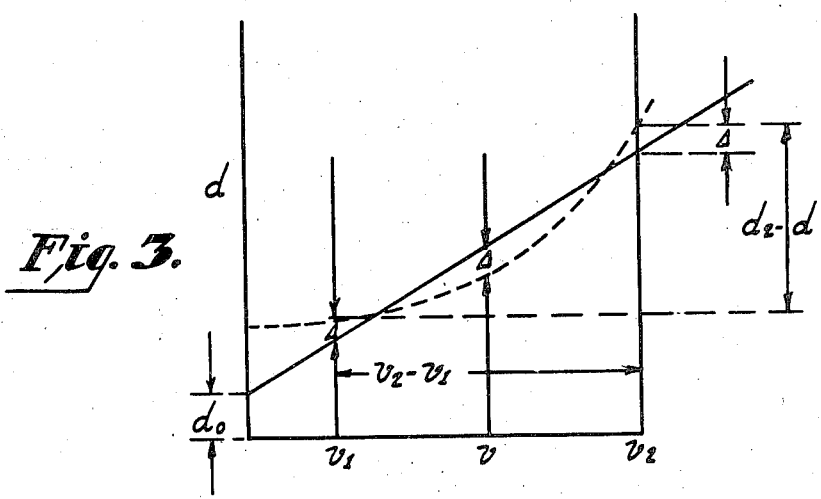
Figure 4:
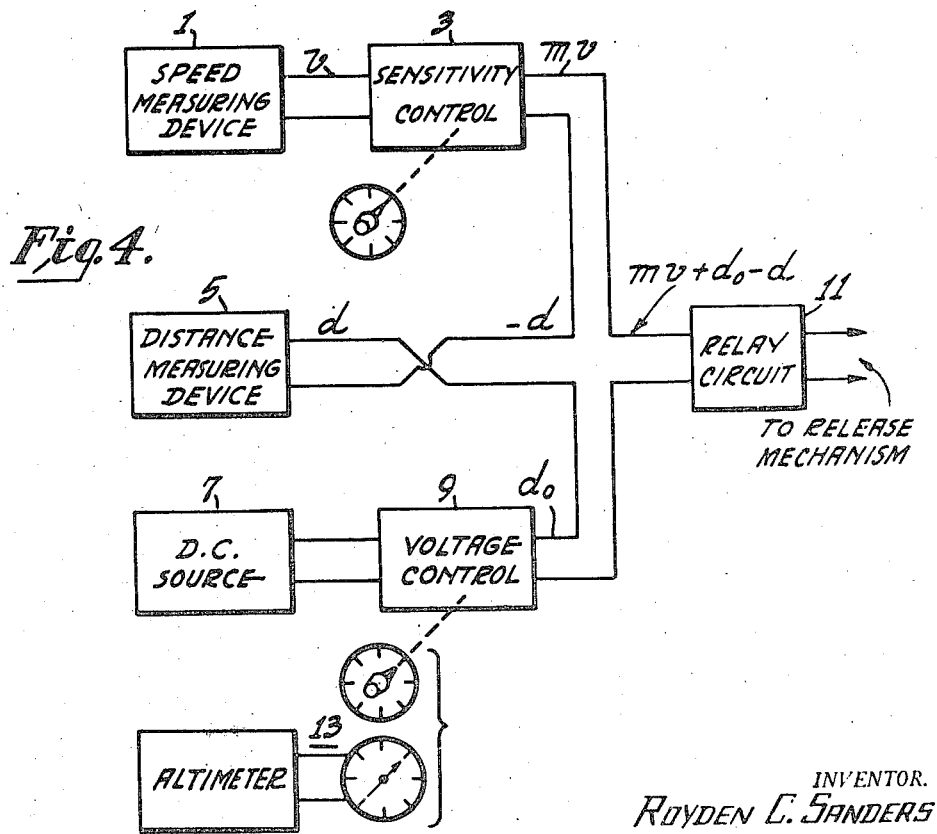

These and other objects will become apparent to those skilled in the art upon consideration of the following description, with reference to the accompanying drawing, of which Figure 1 is a schematic diagram illustrating a bomb release problem, Figure 2 is a group of graphs illustrating relationships between speed, distance, and altitude in the solution of the problem of Figure 1, Figure 3 illustrates the determination of the linear approximation to one of the curves of Figure 2, Figure 4 is a schematic block diagram of a system for performing the required functions of speed and distance measuring and computation of release distance for a given altitude, Figure 5 is a schematic block diagram of a modification of Figure 4, Figure 6 is a group of graphs illustrating the variations in frequency of energy radiated and received by the system of Figure 5 and Figure 7 is a group of graphs illustrating beat frequencies produced in the operation of the system of Figure 5.

Referring to Figure 1, a bomb is to be released from an airplane at the point B, flying at an altitude A, at the proper point to strike a target at the point C. Assuming free fall of the bomb, $$A = \tfrac{1}{2}gt^2$$

where A is the altitude, $g=32.2$ feet per second per second, and $t$ is the time of fall.

$$t = \sqrt{\frac{2A}{32.2}} = \frac{\sqrt{A}}{4.01} \text{ seconds}$$

The horizontal distance D from the target at which the bomb must be released is thus $$D = V\frac{\sqrt{A}}{4.01}$$

where V is the horizontal component of the speed of the airplane with respect to the target. In other words, for any specific altitude there is a particular relationship between V and D which must exist at the instant the bomb is released.

By means of radio reflection equipment, such as an altimeter of the FM type, the altitude A may be measured continuously. Similarly, the slant distance $d$ (Figure 1) to the target may be measured. The slant velocity $v$ can also be determined continuously by this type of equipment, as described hereinafter. Since the equipment measures the slant distance and the slant speed relative to the target rather than the horizontal distance and horizontal speed, it is necessary to determine the point of release in terms of these quantities.

The horizontal distance to the target is given by $$D = Vt \qquad (1)$$

but $$D = d\cos\theta \qquad (2)$$

and $$V = \frac{v}{\cos\theta} \qquad (3)$$

Substituting in Equation 1

$$d\cos\theta = \frac{v}{\cos\theta}t \qquad (4)$$

$$\therefore d = \frac{vt}{\cos^2\theta} \qquad (5)$$

where
D=Horizontal distance
V=Horizontal speed
A=Altitude
$t$=Time of fall
$v$=Slant speed relative to target
$d$=Slant distance to target In order to get the result in terms of slant distance and slant speed rather than angle $$A^2 + D^2 = d^2$$

$$\cos\theta = \frac{D}{d} \text{ and } \cos^2\theta = \frac{D^2}{d^2}$$

and $$D^2 = d^2 - A^2$$

$$\therefore \cos^2\theta = \frac{d^2 - A^2}{d^2}$$

Substituting in Equation 5

$$d = \frac{vtd^2}{d^2 - A^2}$$

$$d^3 - dA^2 = vtd^2$$

and $$d^2 - vtd - A^2 = 0 \qquad (6)$$

a quadratic equation, the solution of which is $$d = \frac{vt}{2} + \sqrt{\left(\frac{v}{2}t\right)^2 + A^2} \qquad (7)$$

where $$t = \frac{\sqrt{A}}{4.01}$$

Since the equipment will require a certain finite time T to operate and release the bomb after the relationship of Equation 7 is established, the dropping distance $d$ must be increased accordingly, by adding to the time of fall $t$ the delay time $T$:

$$d=\frac{v}{2}\left(\frac{\sqrt{A}}{4.01}+T\right)+\sqrt{\left(\frac{v}{2}\frac{\sqrt{A}}{4.01}+T\right)^2+A^2} \quad (8)$$

In practice, the delay time $T$ may be of the order of 0.4 sec. The value must be determined for the particular equipment used.

A series of curves of slant speed vs. slant dropping distance, for different altitudes may be plotted from Equation 8. Figure 2 shows a typical group of such curves. The curves do not pass through zero because they are based on slant speed and slant distance. When the airplane is directly above the target, the distance to the target is the altitude, rather than zero.

In the system of the present invention, a straight line approximation to the curves of Figure 2 is used, rather than the actual non-linear relation between speed and distance. Figure 3 shows one of the curves of Figure 2, plotted (dash line) on a different scale so as to accentuate the nonlinearity. To obtain the best approximation to the curve, a range of speeds most likely to be used is selected. The lower and upper limits of this range are designated $v_1$ and $v_2$, respectively, in Figure 3. The corresponding dropping distances, determined from Equation 8, are $d_1$ and $d_2$. The solid line, representing the linear approximation, is drawn with a slope $$m=\frac{d_2-d_1}{v_2-v_1}$$

and in a position such that its maximum deviation $\Delta$ from the dash curve is a minimum over the selected speed range.

The equation of the linear approximation is $$d=mv+d_0 \quad (9)$$

where $d_0$ is the distance intercept, indicated in Figure 3. The constants $m$ and $d_0$ are different for each altitude.

Refer to Figure 4. A speed measuring device 1, capable of providing a D.-C. output voltage proportional in magnitude to the slant speed $v$, is connected to a sensitivity control 3. The device 1 may be of the radio reflection type, described hereinafter. The sensitivity control may be an attenuator connected in the output circuit of the device 1, or any other means for varying the proportionality constant $m$ between the D.-C. output voltage and the speed $v$.

A distance measuring device 5, arranged to provide D.-C. output proportional in magnitude to the slant distance $d$, has its output circuit connected in series with that of the control 3 in opposing polarity, so that equal changes in the two outputs would produce no change in their sum. The device 5 may also be of the radio reflection type, similar in construction and operation to an FM altimeter.

A D.-C. source 7 is also connected in series with the outputs of the devices 3 and 5, through a voltage control 9. The algebraic sum of the three output voltages is applied to a relay device 11, which, for the sake of simplicity in explanation, is assumed to operate upon the occurrence of zero voltage at its input circuit, although in fact it may be designed to operate at any predetermined voltage, providing an additional voltage is supplied to it so that operation will occur when the algebraic sum of the outputs of the devices 3, 5 and 9 is zero.

The controls 3 and 9 are adjustable in accordance with the altitude at which a bombing run is to be made, to positions corresponding to the constants $m$ and $d_0$, respectively. An altimeter 13, which may be of the above-mentioned radio reflection type, is provided to enable the pilot to maintain the altitude to which the controls 3 and 9 set. The controls may be ganged to a single manually operable knob, or automatically operated from the altimeter by means of a servo system, not shown.

In the operation of the system, the controls 3 and 9 are set as described above, and the aircraft is flown toward the target. The total voltage applied to the relay circuit 11 is proportional to $mv+d_0-d$. As the target is approached, the component corresponding to $d$ will decrease with decrease in the slant distance. The component corresponding to $mv$ will ordinarily decrease also, although, at a varying rate, because of decrease in the value of cosine $\theta$ (see Figure 1) as the target is approached. When the condition of Equation 9

$$d=mv+d_0$$

is reached, the total voltage applied to the relay circuit 11 is zero, and the bomb is released. Providing the azimuth (horizontal direction of flight) is correct, the bomb will strike the target, within the limit of error of the linear approximation. The magnitude of this error is greatest at the highest altitude. At an altitude of 300 feet the maximum error over the range of 110 ft./sec. to 500 ft./sec. (slant speed) is plus or minus 12 feet.

The function of speed measuring and distance measuring may be combined in a single system, employing but one transmitter and one receiver. Referring to Figure 5, a transmitter 15, designed to operate at a carrier frequency of, for example, 500 megacycles per second, is connected to a transmitting antenna 17 and arranged to have its frequency varied cyclically by a frequency modulator 19. The modulator 19 may be of the vibratory variable capacitor type described in copending U. S. application Serial Number 471,003, filed January 1, 1943 by S. V. Perry and entitled Capacity modulator unit. The modulator 19 is connected to be energized by a low frequency oscillator 21. The amount of energization of the modulator 19, and hence the range of capacity variation provided thereby, is controlled by means of an adjustable voltage divider 23 included in the connection from the oscillator 21. Alternatively, the output of the oscillator 21 may be controlled by variation of the feedback, the supply voltage, or other known means.

A detector 25 is connected to a receiving antenna 27 and to the transmitter 15. The detector 25 may comprise a circuit of the type described in copending U. S. application Serial Number 445,720, filed June 4, 1942 by R. C. Sanders, Jr., now Patent No. 2,420,199 which issued May 6, 1947, and entitled Frequency modulated altimeter or distance indicator, or any circuit capable of providing beat frequency output in response to signals received directly from the transmitter 15 and by reflection to the antenna 27. The output circuit of the detector 25 is connected to an amplifier 29, which is in turn connected through a voltage amplitude limiter circuit 31 to a frequency responsive circuit such as an averaging cycle counter 33, which may be of the type described in U. S. Patent 2,228,367, granted to R. C. Sanders, Jr. and entitled Frequency meter, or any other circuit which will provide a D.-C. output substantially proportional in magnitude to the frequency of the input.

The output of the counter circuit is connected to a low pass filter 35 and to a band pass filter 37. The band pass filter is connected through an amplifier 38 to a rectifier 39. The output circuits of the low pass filter 35 and the rectifier 39 are connected in series with a D-C source 41 to a voltage responsive relay circuit 43. The voltage supplied by the source 41 is variable by means of an adjustable voltage divider 45. The relay circuit 43 may comprise merely a relay designed to close only when deenergized, or may include one or more electron discharge tubes connected to energize a relay and biased to provide closure of the relay upon the occurrence of zero input voltage.

The operation of the system of Figure 5 is as follows: The transmitter 15 is varied cyclically in tuning by the modulator 19 to produce an output which varies in frequency as shown by the solid line 47 of Figure 6. This output is applied to the detector 25 and to the transmitting antenna 17. Some of the energy radiated by the antenna 17 is reflected by the target back to the receiving antenna 27. Preferably both antennas 17 and 27 are made directive, so as to minimize reflected signals from other objects and the surface. The signal picked up by the antenna 27 varies in frequency like the transmitted signal, but is delayed with respect thereto by the time required for the radiation to travel from the antenna 17 to the target and back to the antenna 27.

Assuming for the moment that there is no variation in the distance of the target from the antennas, the received energy will vary over the same frequency range as the transmitted energy, as shown by the solid line 49 of Figure 6. The difference between the instantaneous frequencies of the two inputs to the detector 25 is the same during the periods when the frequency of the transmitter 15 is increasing as it is when the transmitter frequency is decreasing. The beat frequency output of the detector 25 accordingly is of a constant frequency proportional to the distance of the target, if the relatively short crossover periods at the inflection points of the modulation cycle are neglected. The frequency of the output of the detector 25 under this condition is illustrated by the line 51 of Figure 7, and is $$\frac{Sf_m d}{246} \text{ cycles per second}$$

where $S$ is the sweep width in megacycles per second per sweep, $f_m$ is the modulation frequency and $d$ is the distance in feet.

If the vehicle carrying the antennas 17 and 27 is moved toward the target, the frequency of the received signal will be increased during both the up-sweep and down-sweep of the modulation cycle by an amount proportional to the velocity, as a result of Doppler effect. The frequency of the received signal under this condition is shown by the dash line 53 of Figure 6. The difference in frequency between the transmitted and received signals is decreased during the modulation up-sweep and increased during the down-sweep. The resulting variation in the frequency of the output of the detector 25 is shown by the line 55 in Figure 7. During the up-sweep, the beat note is decreased in frequency by $$\frac{2f_0 v}{C}$$

where $f_0$ is the carrier frequency in cycles per second, $v$ is the velocity and $C$ is the radiation propagation velocity in feet per second. During the down-sweep, the beat note is increased in frequency by the same amount. Thus, the average frequency of the beat note is proportional to the distance $d$ while the difference between the maximum and minimum frequencies of the beat note is proportional to the speed $v$. The proportionality $m$ between the average frequency $$\frac{Sf_m d}{246}$$

and the variation $$\frac{2f_0 v}{C}$$

of the beat note due to speed may be regulated by controlling the sweep width $S$, by means of the voltage divider 23. The output of the detector 25 is amplified in the amplifier 29, and limited to a constant amplitude by the limiter 31. The output of the limiter 31 is converted by the counter 33 to a unidirectional voltage varying in amplitude in accordance with the variations in frequency of the output of the detector 25. The average value of the counter output is thus proportional to distance. This component is separated by the low pass filter 35. The distance may be indicated by means of a D.-C. meter 44 connected to the output of the filter 35. An analysis of the output wave of the counter 33 will show that it contains a sinusoidal component of the same frequency as that of the oscillator 21 and of an amplitude proportional to the difference between the maximum and minimum values of the successive square waves of the counter output. This sinusoidal component is separated by the band pass filter 37, amplified by the amplifier 38, and rectified by the rectifier 39 to provide a unidirectional voltage having a magnitude proportional to the amplitude of the sinusoidal wave, and hence to the velocity. The speed may be indicated by means of a D.-C. meter 46 connected to the output of the rectifier 39. The outputs of the filter 35, rectifier 39 and the D.-C. source 41 are added serially and applied to the relay circuit 43 in the system of Figure 4. The voltage dividers 23 and 45 are adjusted in accordance with altitude as described in connection with Figure 4 providing operation of the relay circuit 43 upon the occurrence of the correct relationship between speed and distance.

It will be apparent to those skilled in the art that numerous modifications of the system of Figure 5 may be made without altering the principle of operation thereof. For example, a separate counter, similar to the counter 33, may be connected between the output of the limiter 31 and the input to the band pass filter 37. A frequency discriminator circuit, of the type used in FM radio receivers, might be used instead of the separate counter. The discriminator may comprise merely a selective circuit connected to a rectifier.

Thus the invention has been described as an automatic bomb release system, employing radio reflection measurements of target distance and speed with respect to the target to actuate a release mechanism upon the occurrence of a proper relationship between speed and distance. In the described system, distance measurements are made by means of frequency modulated waves as an FM type of altimeter. Speed is measured by the same equipment by measuring the deviation in frequency of the beat between the direct and reflected waves. This variation is caused by Doppler effect and is proportional to the speed. Speed proportional and distance proportional voltages are combined to provide a resultant voltage which reaches a predetermined value when the correct conditions for release exist.

I claim as my invention:

1. The method of providing response to the occurrence of a predetermined relationship between the speed of a mobile craft with respect to a reflecting object and the distance of said craft from said object, comprising the steps of producing a first voltage having a magnitude bearing a predetermined relationship to said speed, producing a second voltage having a magnitude bearing a second predetermined relationship to said distance, combining said first and second voltages to produce a resultant voltage, and producing a response to the attainment by said resultant voltage of a predetermined magnitude.

2. The method of providing response to a predetermined relationship between the speed of a mobile craft with respect to a reflecting object and the distance of said craft from said object, including the steps of radiating from said craft a frequency modulated signal, receiving said signal at said craft after reflection, combining said transmitted signal and said received signal to produce a beat signal, producing in response to said beat signal a voltage proportional in magnitude to the average frequency of said beat signal, producing in response to said beat signal a second voltage proportional to the range of variation of frequency of said beat signal, combining said first and second voltages to provide a resultant voltage, and producing a response to the attainment by said resultant voltage of a predetermined magnitude.

3. The method of providing response to the occurrence of a predetermined relationship between the speed of a mobile craft with respect to a reflecting object and the distance of said craft from said object, comprising the steps of radiating from said craft a frequency modulated signal, receiving said signal at said craft after reflection, combining said transmitted signal and said received signal to produce a beat signal of cyclically changing frequency, producing in response to said beat signal a first voltage proportional in magnitude to the average frequency of said beat signal, producing in response to said beat signal a second voltage of magnitude cyclically changing in accordance with the frequency of said beat signal, separating from said second voltage an alternating component voltage, rectifying said component voltage, producing a third voltage of predetermined constant magnitude, combining said first and third voltages with said rectified component voltage to produce a resultant voltage, and producing a response to the attainment by said resultant voltage of a predetermined magnitude.

4. A system for providing response to a predetermined relationship between speed and distance, including radio transmitter means, frequency modulator means connected to said transmitter for cyclically varying the frequency of operation thereof, receiver means including a demodulator connected to said transmitter to provide a beat frequency output in response to reflection of signals radiated by said transmitter, frequency responsive means coupled to said demodulator means to provide an output voltage varying in magnitude in accordance with variation in the frequency of said beat frequency output, filter means connected to said frequency responsive means to derive from said voltage a second voltage proportional to the average magnitude thereof, further filter means connected to said frequency responsive means to derive from said voltage a third voltage corresponding to an alternating component thereof, means for rectifying said third voltage, a relay circuit and means for applying the sum of said second voltage and said third rectified voltage to said relay circuit.

ROYDEN C. SANDERS, Jr.

REFERENCES CITED

The following references are of record in the file of this patent:

UNITED STATES PATENTS

| Number | Name | Date |
|---|---|---|
| 2,268,587 | Guanella | Jan. 6, 1942 |

FOREIGN PATENTS

| Number | Country | Date |
|---|---|---|
| 115,065 | Australia | April 23, 1942 |